United States Patent [19]

Ryan et al.

[11] Patent Number: 5,782,116
[45] Date of Patent: Jul. 21, 1998

[54] STEERING WHEEL AND AIR-BAG LOCK

[76] Inventors: Timothy Ryan, 200 Beacon Hill Dr., Apt. 9P, Dobbs Ferry, N.Y. 10522; Lawrence Cunningham, 3044 Albany Crescent, Bronx, N.Y. 10463

[21] Appl. No.: 701,247

[22] Filed: Aug. 23, 1996

[51] Int. Cl.⁶ .................................................. B60R 25/02
[52] U.S. Cl. ........................ 70/209; 70/226; 74/558
[58] Field of Search ..................... 70/158–173, 207, 70/209, 211, 212, 225, 226, 237, 238; 74/558; 180/287

[56] References Cited

U.S. PATENT DOCUMENTS

| | | | |
|---|---|---|---|
| 1,154,389 | 9/1915 | Fogalsang | 70/209 |
| 1,368,054 | 2/1921 | Recher | 70/212 |
| 1,395,532 | 11/1921 | Tilden | 70/209 |
| 5,450,736 | 9/1995 | Volkmar | 70/209 |
| 5,454,240 | 10/1995 | Whitney | 70/209 |
| 5,537,847 | 7/1996 | Dalton et al. | 70/226 X |
| 5,540,067 | 7/1996 | Kim | 70/209 |
| 5,555,753 | 9/1996 | Matlock | 70/226 X |
| 5,555,754 | 9/1996 | Ferrante | 70/209 |
| 5,605,063 | 2/1997 | Taurog | 70/209 |

*Primary Examiner*—Lloyd A. Gall
*Attorney, Agent, or Firm*—Herbert Dubno

[57] ABSTRACT

A full wheel cover steering wheel lock and protector prevents access to an air bag in the steering wheel hub when an inner semicircular shell segment is swung out of an outer semicircular shell segment to completely enclose the steering wheel. A locking bar can be pulled into an extended position from a tunnel on the outer segment and has an arm engaging in a slot of the inner segment to lock the segments in the outwardly swung position while a shoe on its arm can engage the inner periphery of the steering wheel. The device largely fabricated of reinforced polycarbonate is of compact construction and light weight.

16 Claims, 8 Drawing Sheets

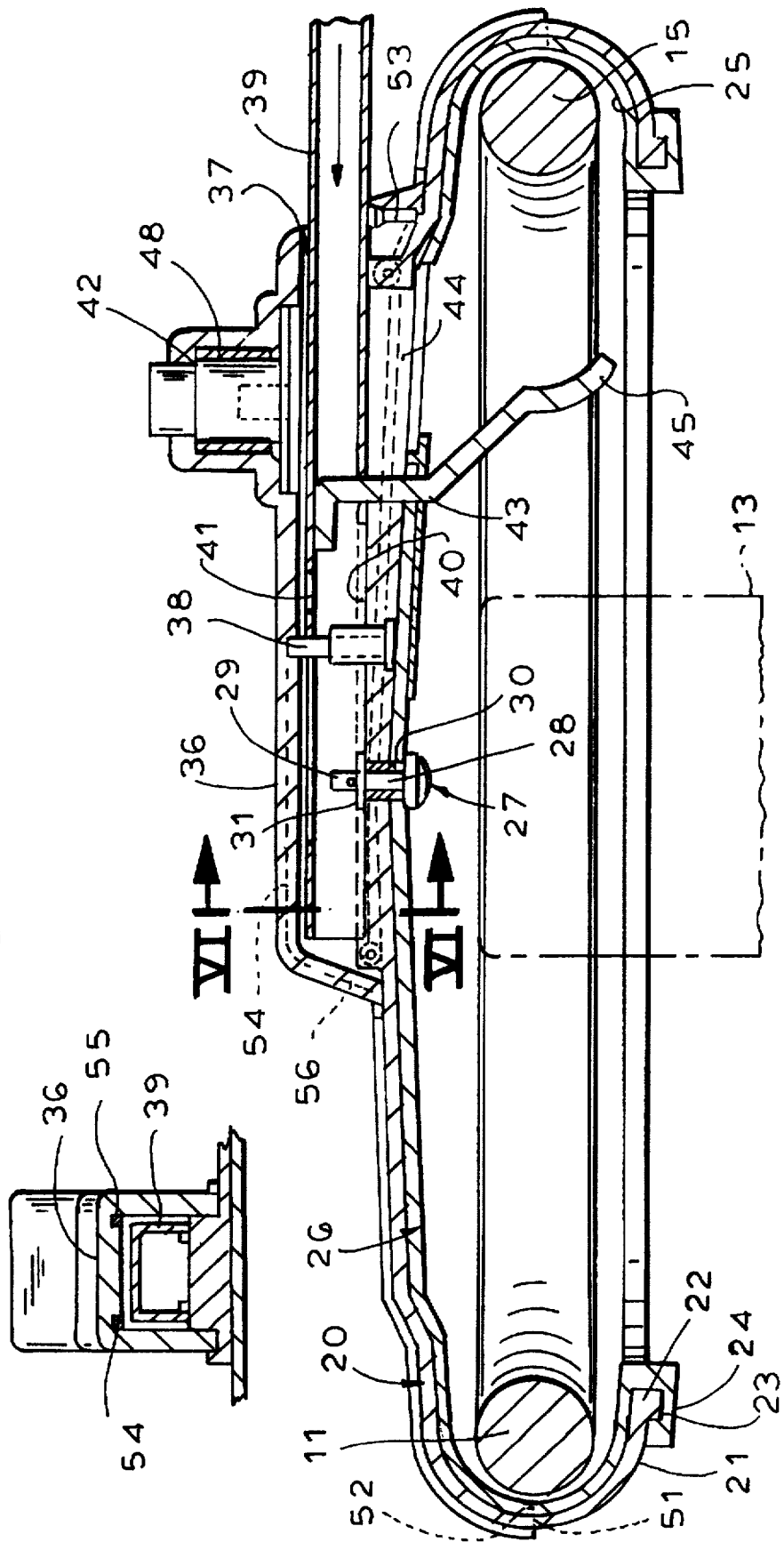

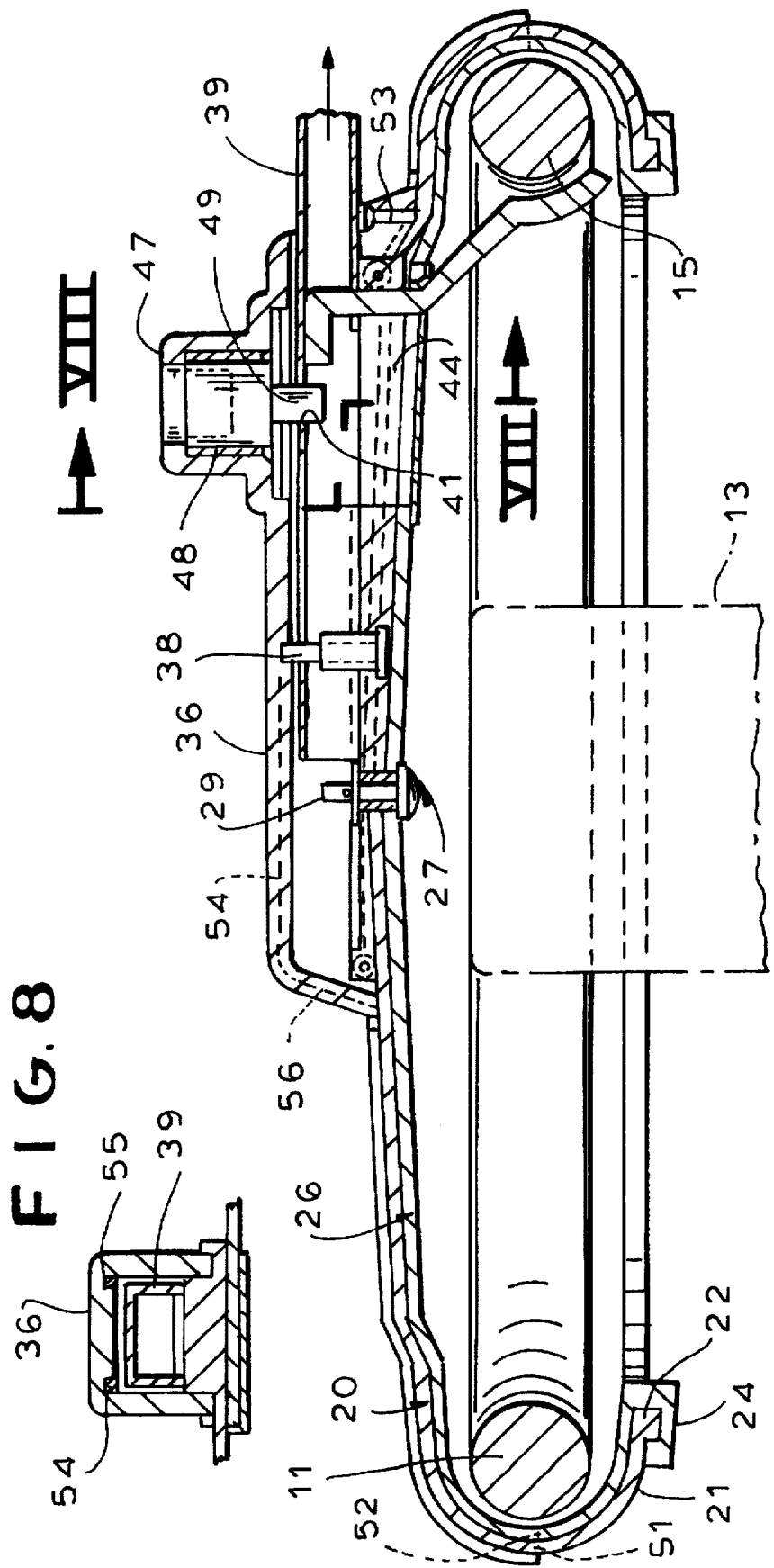

STEERING WHEEL AND AIR-BAG LOCK

FIELD OF THE INVENTION

Our present invention relates to a steering wheel and air-bag locking or air-bag protective system and, more particularly, to an antitheft device which prevents use of the steering wheel of an automotive vehicle and, at the same time, protects the vehicle against theft of an air bag which may be housed in the steering column.

BACKGROUND OF THE INVENTION

Antitheft devices for automotive vehicles currently on the market include bar-shaped units which can be connected to the steering wheel by being hooked under or over the rim of the steering wheel and which, when locked in place, have a portion of the bar extending beyond the steering wheel and capable of being engaged by the windshield, the driver's door or some other part of the vehicle body so that rotation of the steering wheel is sharply restricted.

While such systems have proved to be a limited deterrent to automobile theft, it is not difficult for the skilled thief to remove the device or for the device to be removed by cutting through the rim of the steering wheel even by less skilled thieves. Furthermore, the bar-type systems alone cannot prevent theft of the air bag which, any vehicle by reason of vintage may be housed in a compartment in the steering post.

It is also known to combine this bar-type antitheft device with a cover which spans across the air bag compartment and is held in place by the bar. In that case, the cover can prevent theft of an air bag but, since removal of the locking bar is not a very great problem to the skilled thief, removal of the bar can make the air bag accessible.

In the art there are also full wheel covers which can fit over the entire steering wheel and thus can serve to at least a limited extent to prevent removal of the steering wheel air bag and may also act as a deterrent to automobile theft.

None of the existing systems, however, is fully satisfactory and can provide the long-term delay in access to either the steering wheel air bag or to use of the steering wheel which is required as a satisfactory deterrent to auto theft or to theft of the air bag.

More particularly, U.S. Pat. No. 5,128,649 of 7 Jul. 1992 describes a motor vehicle alarm which can be locked on the steering wheel of a vehicle and extend diametrically across the hub of the latter.

The device has receptacles at either end for engaging the rim of the steering wheel and circuitry for recognizing an authorized user. As in all cases in which the devices do not fully enclose the steering wheel, however, cutting through of the steering wheel will render the device removable but nevertheless allow the vehicle to be driven and hence stolen.

A locking device which engages over the hub portion of the wheel can be connected to the accelerator and clutch pedal in the system of U.S. Pat. No. 4,699,238 issued 13 Oct. 1987 and, while in this system as long as an integrity of the lock is maintained, access to the hub is prevented and the steering wheel cannot be rotated. The device is particularly sensitive to severing of the stems.

Other devices which engage a steering wheel only partly are described in U.S. Pat. Nos. 5,025,646 of 25 Jun. 1991; 4,134,282 of 16 Jan. 1979; 4,974,433 of 4 Dec. 1990; 4,103,524 of 1 Aug. 1978; 4,829,797 of 16 May 1989; 5,055,823 of 8 Oct. 1991; 5,333,478 of 2 Aug. 1994; 5,400,627 of 28Mar. 1995; and 4,982,810 of 8 Jan. 1991.

Mention in this regard may also be made of design patent DES 352,490 of 15 Nov. 1994.

Recognition of the value of wholly enclosing access to the steering wheel, U.S. Pat. No. 3,982,602 of 28 Sep. 1976 describes a clam-shell device which is locked by a padlock through a conventional hasp arrangement. This device does indeed protect both the steering wheel rim and the hub against access at the cost of a highly bulky protective unit. U.S. Pat. No. 5,353,614 of 11 Oct. 1994 likewise discloses a relatively bulky structure which wholly encloses the steering wheel and thus extends across the hub to prevent access to the latter. In that system the engagement with the steering wheel from below, while effective for the portion of the cover itself, is limited for the locking bar which is separate from the cover so that complex manipulation is required to affix the assembly to the steering wheel.

OBJECTS OF THE INVENTION

It is, therefore, the principal object of our present invention to provide an improved antitheft device which will simultaneously reduce the access to the steering wheel air bag and prevent steering wheel use for at least a period sufficient to function as a substantial deterrent to such theft.

Another object of the invention is to provide a steering wheel locking system which is a significant improvement over the bar type, combined bar and shield and full steering wheel cover devices heretofore used or proposed.

Still another object of this invention is to provide an easily storable unitary compact steering wheel and air-bag lock which is free from the drawbacks of especially those earlier devices which completely cover the steering wheel.

SUMMARY OF THE INVENTION

These objects and others which will become apparent hereinafter are attained, in accordance with the invention in a steering wheel lock and an air bag shield which comprises a pair of semicircular half shells pivotally connected together and adapted to slide one into the other and each formed with a plate adapted to lie parallel to a plane of the steering wheel rim and having, along the periphery, a channel reaching over the steering wheel rim so that the two semicircular shells can be relatively rotated from a position in which an inner one of the shells is at least partly received in an outer one of the shells and, in this position, the device can be placed on the steering wheel, and a second position in which the inner shell is rotated so that it lies predominantly outside the outer shell and, the two shells together form a complete enclosure for the underside, periphery and top of the steering wheel, spanning fully across the air bag compartment. According to the invention, on the outer shell, a bar is provided with a lock which, in the unlocked state, allows a slider to move within the bar and latch in a notch of the inner shell. A radially-movable shield in the inner shell can move with the latch generally radially to cover any groove in the bar in which the locking member is slidable. The locking member can be retained, in the locked position of the unit, by a key lock which can be pressed inwardly so as to be set and locked. The bar itself can project beyond the periphery of the two shells in their fully extended positions so that, if the disk formed by the two shells is rotated, the rotation will be impeded by engagement of the bar with a portion of the vehicle body.

According to the invention, the shells are composed of a high-strength synthetic resin, especially a polycarbonate.

With the system of the invention, therefore, a steering wheel is fully covered and gripped by the channel formations of the two shells all around the steering wheel so that there is no location at which the steering wheel can be cut through for removal of the device.

According to a feature of the invention, the bar is received in a tunnel formed unitarily on the outer or first shell and carries an arm which, when the bar is shifted into its locking position, presses against the rim of the steering wheel along the inner periphery thereof. The lock can be mounted on this tunnel close to the mouth of the latter which is open outwardly along the outer periphery of the cover and from which the bar emerges so as to engage, when extended from the tunnel in the locking position, the windshield, seat or door of the vehicle, thereby preventing rotation of the steering wheel.

According to yet another feature of the invention, the inner or second shell segment is formed with a slot into which the arm can extend when the inner or second shell segment is rotated into its outwardly swung position, this slot extending radially and thus receiving the arm as it is brought into engagement with the inner periphery of the rim so that the arm can lock the inner or second shell segment against rotation back into the outer or first shell segment.

The lock, according to the invention, can be a plunger-type lock which, upon insertion of a key and a rotation, can jump out of engagement with the bar but, when pressed inwardly with the bar in its extended position, can engage in a hole in the bar to lock the latter against inward movement enabling removal of the device from the steering wheel.

Since the inner or second shell segment is fully receivable in the first or outer shell segment, the device of the invention is far more compact than earlier full-wheel cover locking devices. Furthermore, there is no point at which any of the locking parts are readily accessible to prying, sawing or other evasive efforts which might damage the cover or enable its removal by an unauthorized person. Even cutting of the bar, which is preferably of hardened steel according to the invention, and thus highly resistant to such cutting, will not enable release of the device.

Only upon authorized or key-operated release of the lock is it possible to urge the bar readily inwardly, thereby drawing the arm out of the slot and allowing the second or inner segment to be rotated into the first or outer segment and permit the device to be lifted from the steering wheel.

BRIEF DESCRIPTION OF THE DRAWING

The above and other objects, features, and advantages will become more readily apparent from the following description, reference being made to the accompanying drawing in which:

FIG. 5 is a cross sectional view taken along the line V—V of FIG. 1;

FIG. 6 is a cross sectional view taken along the line VI—VI of FIG. 5;

FIG. 7 is a view similar to FIG. 5 with the locking bar extended, i.e. illustrating the locking position of the device;

FIG. 8 is a section along the line VIII—VIII of FIG. 7;

SPECIFIC DESCRIPTION

Figure 10:
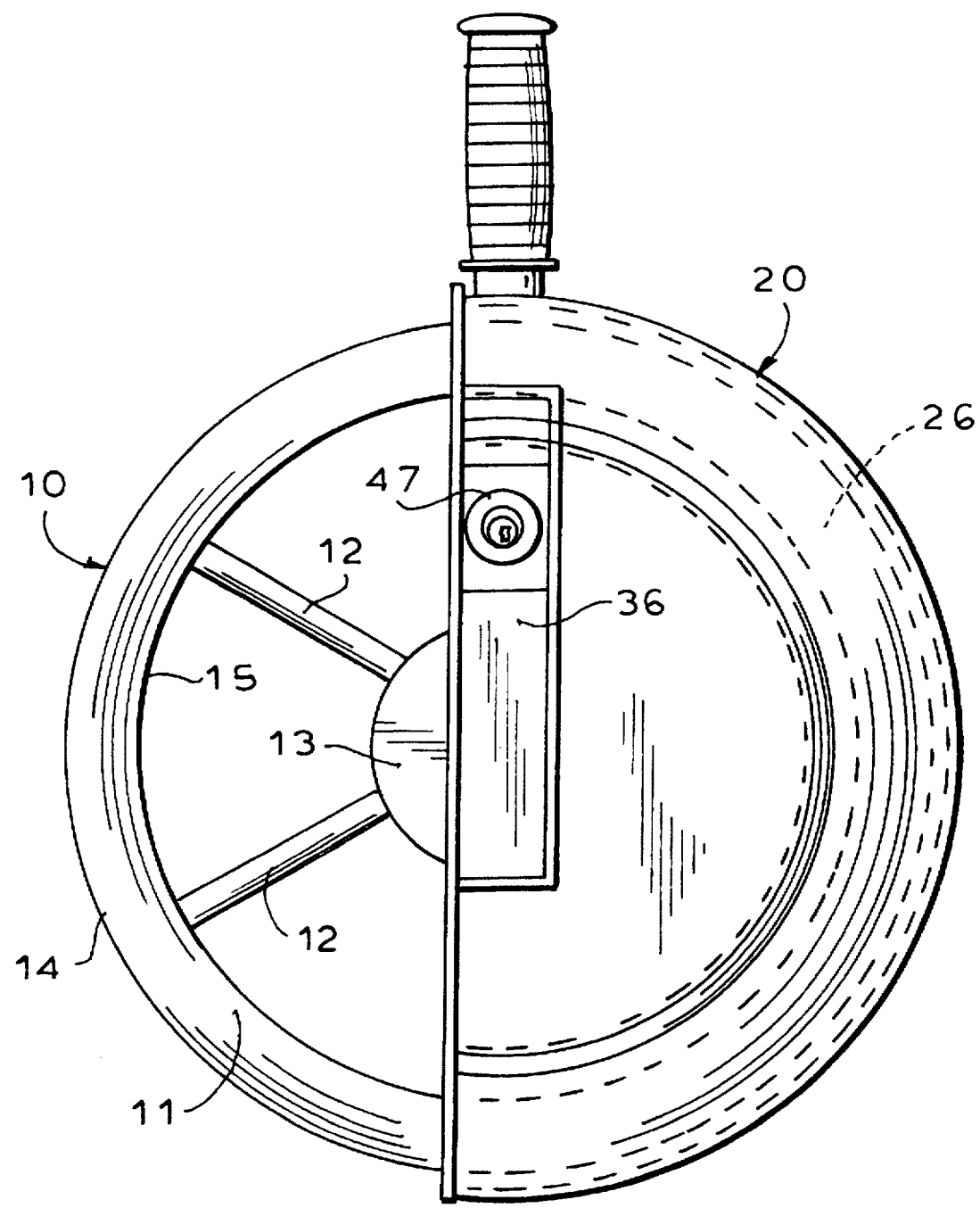
FIG. 10 is a view similar to FIG. 1 illustrating the position wherein the inner shell segment is still within the outer shell segment but the device has been placed upon the steering wheel.

In the drawing we have shown a steering wheel cover and lock system which prevents rotation of the steering wheel and also prevents access to any hub component, air bag or the like. In FIG. 10, for example, the steering wheel is represented generally at 10 and comprises a rim 11 connected by spokes 12 to a hub 13 which can house an air bag. The rim 11 has an outer periphery 14 and an inner periphery 15.

Figure 1:
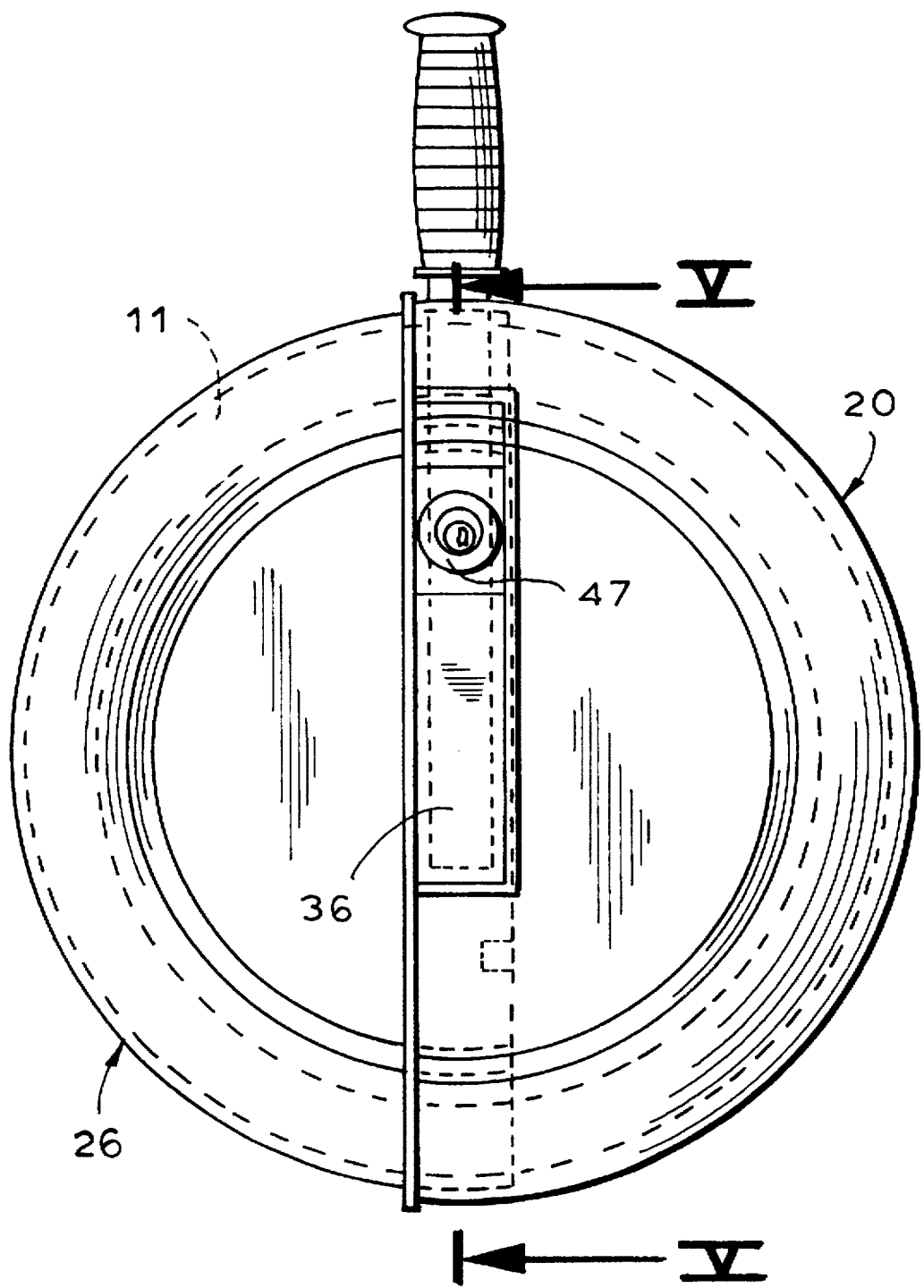
FIG. 1 is a plan view of the device in place on a steering wheel in the unlocked position, with the inner shell segment swung out of the outer shell segment to enclose the steering wheel.
Figure 2:
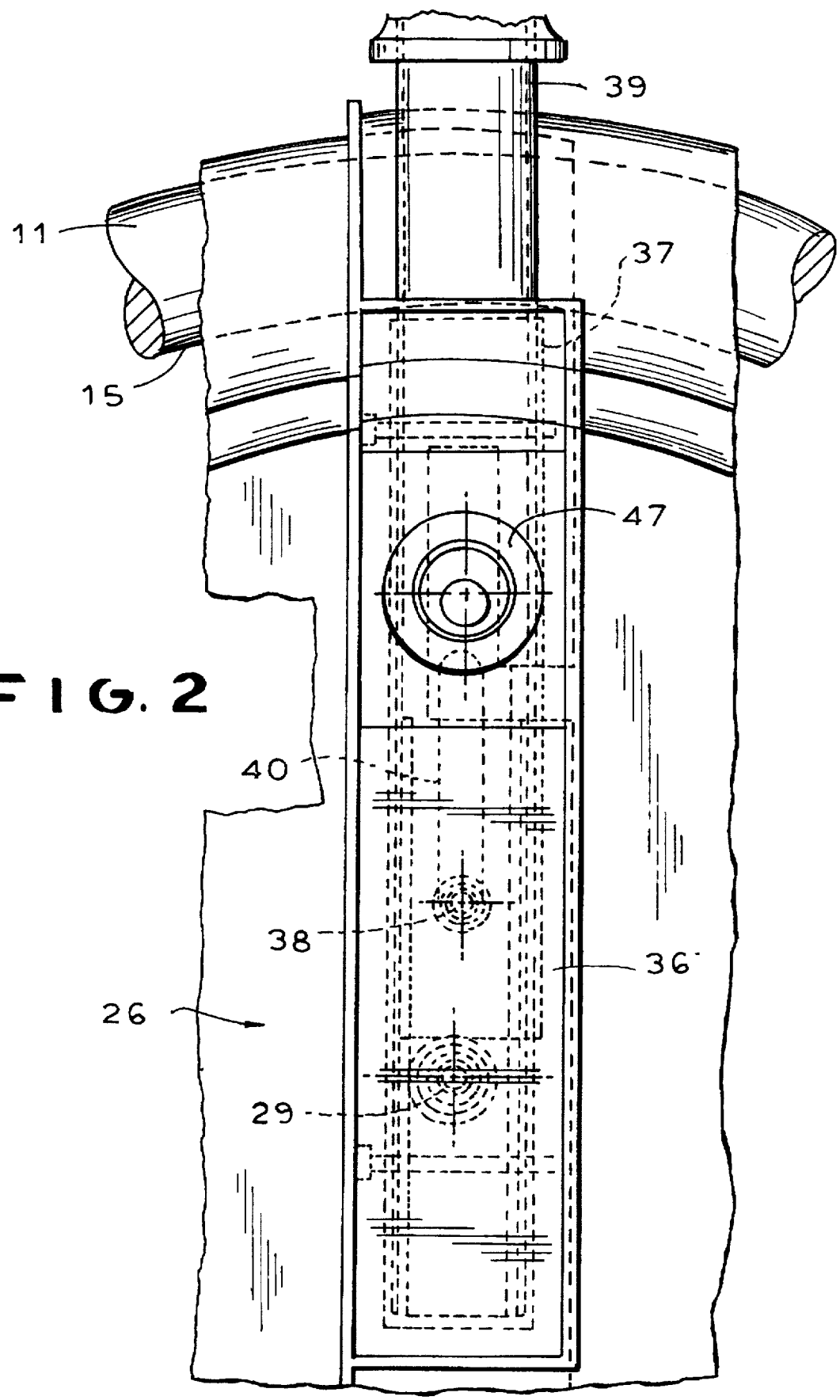
FIG. 2 is a detail view of the tunnel structure and lock arrangement of the device of FIG. 1 drawn to a larger scale.
Figure 3:
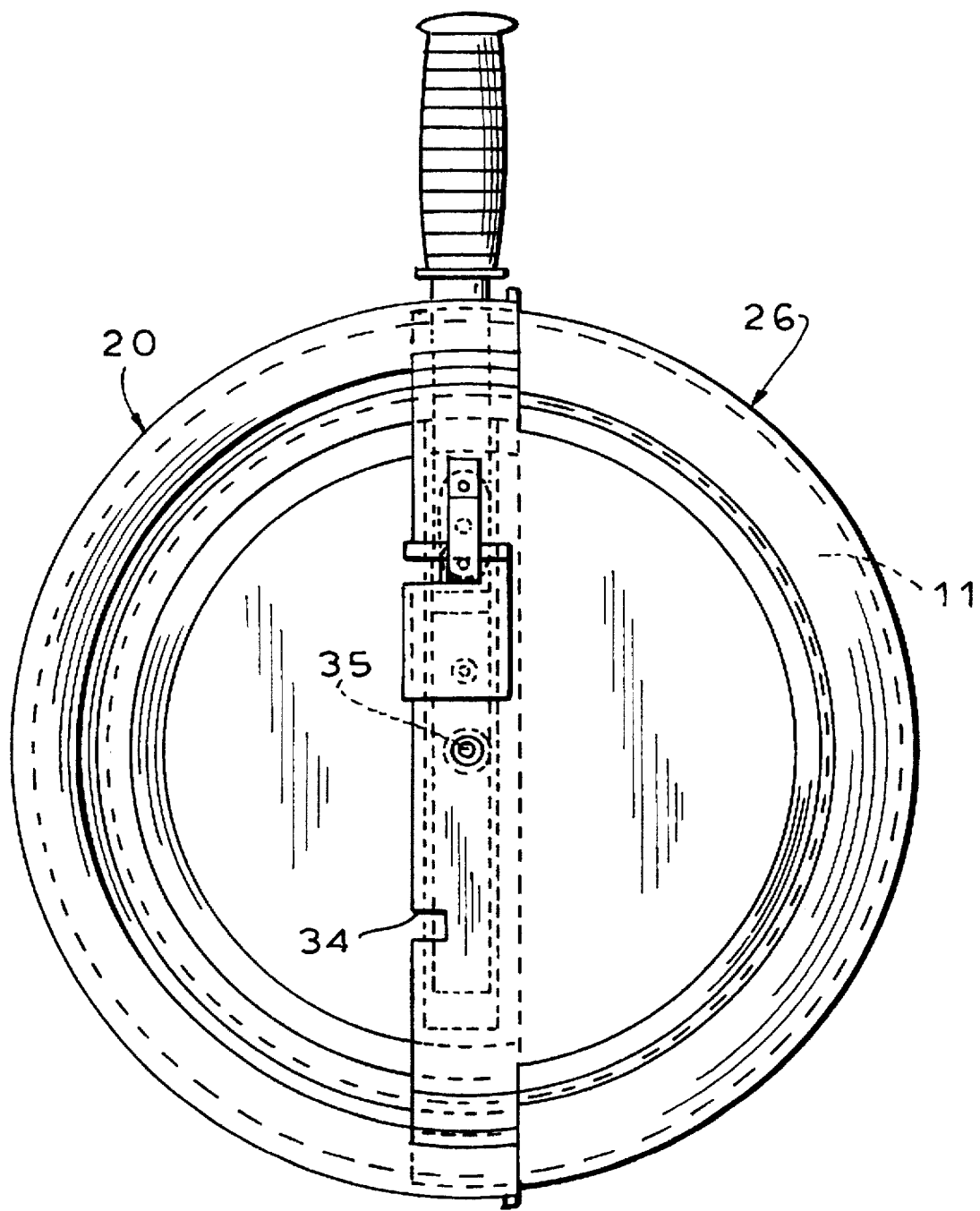
FIG. 3 is a bottom view of the device in the unlocked position.
Figure 4:
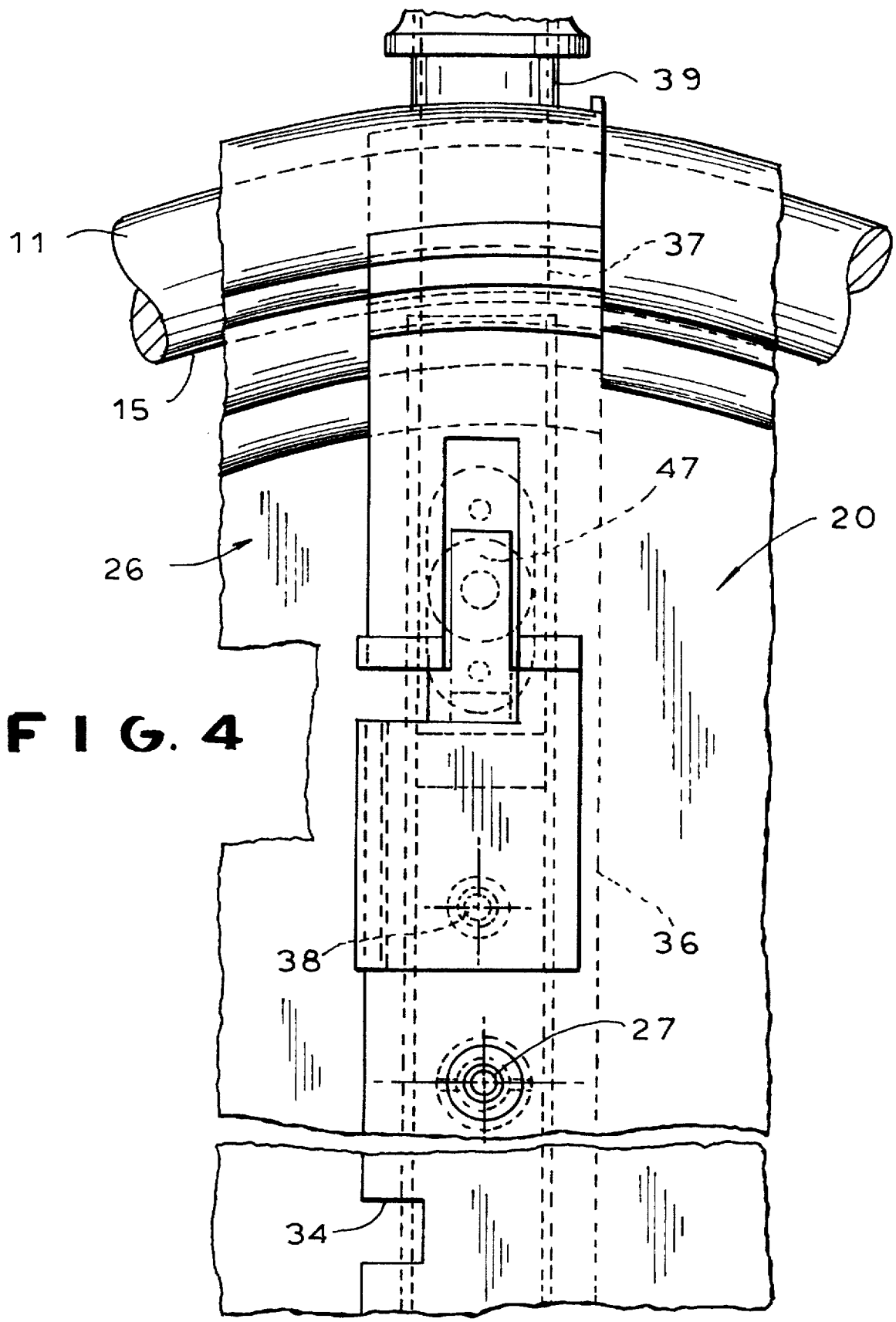
FIG. 4 is a detail of the underside of the device in its unlocked position.

The cover and locking device of the invention comprises an outer generally semicircular shell 20 having, as can be seen in FIGS. 1 and 3, a channel 21 which engages around and beneath the rim 11 of the steering wheel and can be formed with a reinforcing bead 22 which is received in a groove 23 of the bead 24 along the lower edge of the channel 25 of an inner semicircular shell 26 connected to the outer semicircular shell by a pivot means represented at 27 in FIG. 5.

The shells themselves are composed of reinforced synthetic resin material to be of light weight and particularly of a polycarbonate which can be reinforced with glass or carbon fibers or even metal films or fabric as desired.

The pivot means 27 can comprise a pivot pin 28 held in place by a cotter pin 29 and extending through a steel bushing 30 backed by a washer 31.

Figure 9:
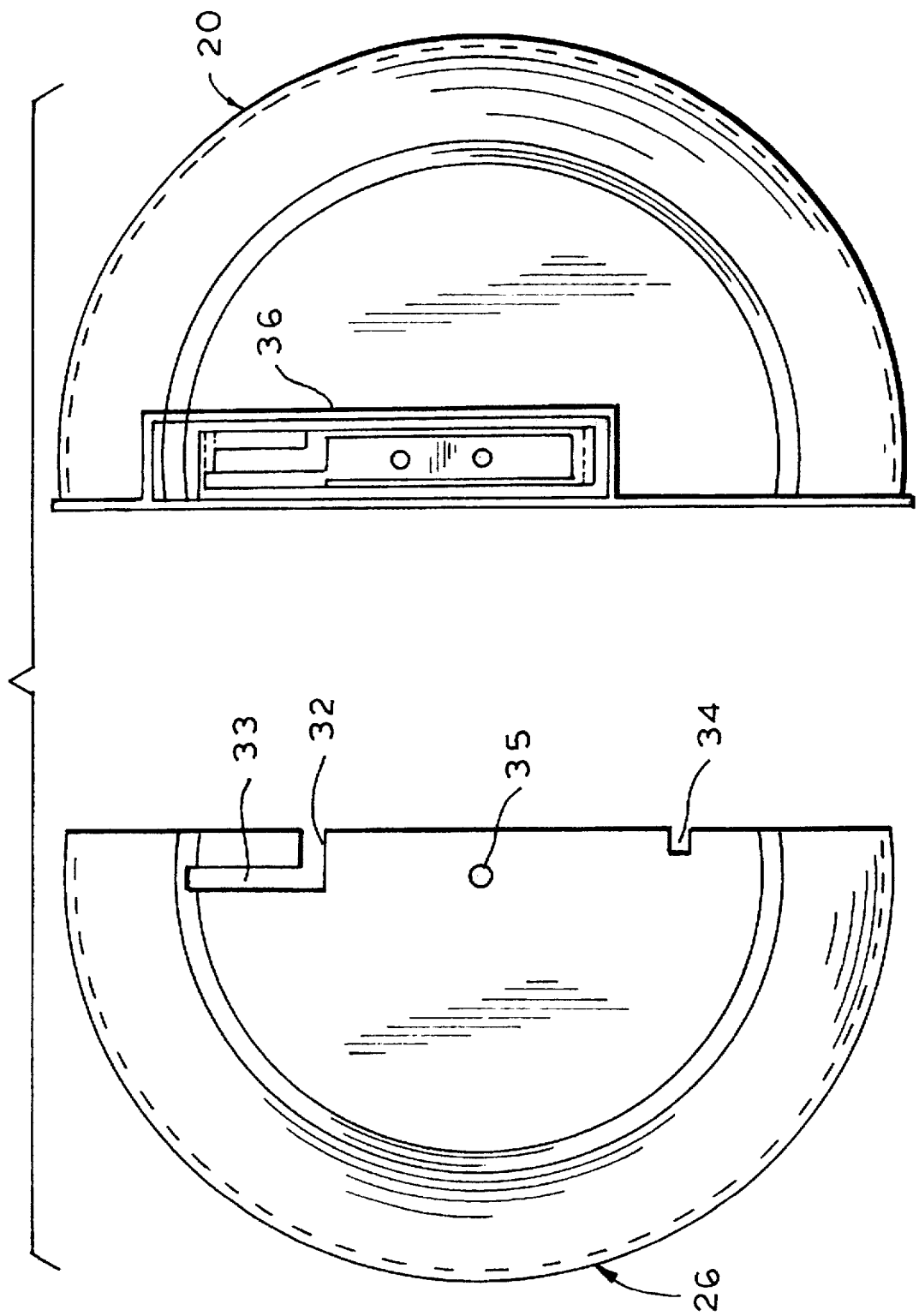
FIG. 9 is a view of the two shell segments from the underside showing the shell segments separated from one another.

The inner shell 26 is formed with a notch 32 opening into a radial slot 33 whose function will be described in greater detail below. A further notch 34 is provided in the inner shell as well and the inner shell has a hole 35 through which the pivot means 27 can extend (FIG. 9).

On the first or outer shell segment a tunnel 36 (FIGS. 5 and 6) having an open end 37 is provided. Like the shells, the tunnel can be formed from a reinforced polycarbonate. The tunnel is held onto the outer shell by concealed pins and by a bolt 38 which also forms a guide for a locking bar 39. The latter has an end emerging from the end 37 of the tunnel, a slot 40 cooperating with the guide bolt 38 and a hole 41 cooperating with a lock 42. The bar 39, composed of hardened steel, can be tubular and can be of a rectangular, preferably square, cross section.

The bar carries an arm 43 which extends transversely to the bar through a slot 44 in the outer shell segment within the tunnel 36. The arm 43 is formed at its free end with a shoe 45 which can engage the steering wheel rim 11 along its inner periphery 15 when the locking bar 39 is pulled out of the tunnel into its extended position (FIG. 7) from its retracted position shown in FIG. 5.

The lock 42 can be a plunger-type lock received in a boss 47 formed on the tunnel 36 within a hardened metal sleeve 48, the plunger lock having a pin 49 engageable in the hole 41 which is aligned with this pin in the extended position of the bar. The latter can engage an obstruction in the vehicle such as the windshield, door or seat to prevent rotation of the steering wheel cover.

In the retracted position of the bar, the arm can lie in the notch 34 of the inner or second shell segment previously described. When the second shell segment is rotated into its outer position from the inner position of FIG. 10, however, the notch 32 is fitted about the arm 43 (FIG. 5) and, as the bar 39 is drawn into its extended position (FIG. 7), it moves along the slot 33 of the inner shell to lock the inner shell in its outwardly swung position.

The plunger lock 42 can then be pressed in so that the pin 49 engages in the hole 41 and retains the steering wheel cover in its fully open and locked position in which the bar is fully extended, the shoe 45 grips the inner periphery 15 of the steering wheel rim and the steering wheel is fully received in the troughs of the two shell segments which fully enclose the steering wheel. When a key is inserted into the lock and rotated, the lock may pop out of engagement with the bar 39 allowing the latter to be pressed inwardly, thereby shifting the arm 43 along the slot 33 until inward rotation of the inner shell segment is permitted and the device can be removed from the steering wheel.

The device in its open position is highly compact since the bar is retracted and the inner shell segment is substantially fully received in the outer shell segment. In this state, the device occupies only a fraction of the space of earlier full-wheel covers and thus is easy to store and handle. The device also is of light weight and user-friendly since the shell segments are composed of reinforced polycarbonate which is much lighter than steel or other metals. Furthermore, the device offers reliable security against theft of an air bag since the steering wheel hub is fully covered, and cannot readily be bypassed or removed by an unauthorized person since there is substantially no weak point at which attack can enable release of the locking system. Indeed even if an attempt to cut through the bar is successful, the arm 43 will continue to lock the two shell segments together to prevent access to the wheel hub and the cover will continue to impede normal steering operations.

Indeed, the bar 39 and the arm 43 are composed of hardened steel to prevent sawing or the like. The plastic parts, namely, the shells and tunnel structures are likewise reinforced with hardened pins or wires, e.g. the wires 54, 55, 56 of the tunnel structure, the annular wires 51 of the outer shell and 52 of the inner shell, the pin 53 at the junction of the tunnel and the outer shell, also to prevent sawing through the unit.

We claim:

1. A steering-wheel protector for a steering wheel having a hub and a rim of an automotive vehicle, said steering-wheel protector comprising:
   a steering-wheel cover including:
      a first generally semicircular disk segment formed with an inwardly open channel configured to receive a portion of the rim of said steering wheel,
      a second generally semicircular disk segment formed with an inwardly open channel configured to receive a remainder of the rim of said steering wheel in an outwardly swung position of said second segment relative to said first segment, and
      pivot means connecting said segments to permit said second segment to be received in said first segment in an inwardly swung position of said second segment, said segments forming a disk receiving the entire rim of said steering wheel and spanned entirely across said steering wheel, peripherally enclosing said rim and preventing access to said hub in said outwardly swung position of said second segment;
   a tunnel formed on said first segment and having an end opening toward a periphery of said disk;
   a locking bar slidable in said tunnel between an unlocked retracted position and a locking extended position and adapted to project from said end beyond said disk in said extended position of said bar and said outwardly swung position of said second segment by an amount sufficient to encounter an obstruction in said vehicle, thereby limiting rotation of said cover and said steering wheel;
   means on said bar for engaging said second segment to prevent inward swing thereof and for engaging said rim along an inner periphery thereof in said extended position, thereby preventing removal of said cover from said steering wheel; and
   a lock on said tunnel engageable with said bar in said extended position for releasably securing said bar in said extended position.

2. The steering-wheel protector defined in claim 1 wherein said means on said bar includes an arm extending transversely of said bar and carrying a shoe engageable with the inner periphery of said rim.

3. The steering-wheel protector defined in claim 2 wherein said second segment is formed with a generally radial slot receiving said arm in said extended position of said bar for preventing inward swing of said second segment in said extended position of said bar.

4. The steering-wheel protector defined in claim 3 wherein said tunnel is formed in one piece with said first segment.

5. The steering-wheel protector defined in claim 3 wherein said second segment is formed with a notch receiving said arm in said inwardly swung position of said second segment.

6. The steering-wheel protector defined in claim 1 wherein said tunnel is anchored to said first segment by concealed steel pins.

7. The steering-wheel protector defined in claim 1 wherein said bar is tubular and composed of hardened steel.

8. The steering-wheel protector defined in claim 1 wherein said segments are composed of reinforced polycarbonate.

9. The steering-wheel protector defined in claim 1 wherein said lock is a plunger lock having a pin engageable in a hole formed in said bar.

10. The steering-wheel protector defined in claim 1 wherein said bar is guided in said tunnel on a pin extending across said tunnel and securing said tunnel to said first segment.

11. The steering-wheel protector defined in claim 1 wherein said pivot means is provided at geometrical centers of both said segments.

12. The steering-wheel protector defined in claim 1 wherein both of said channels reach beneath said rim.

13. The steering-wheel protector defined in claim 1 wherein said tunnel is formed with a boss receiving said lock.

14. The steering-wheel protector defined in claim 1 wherein said bar is of rectangular cross section.

15. The steering-wheel protector defined in claim 1, further comprising hardened steel wires embedded in said segments and said tunnel.

16. The steering-wheel protector defined in claim 8, further comprising at least one hardened steel pin embedded in said polycarbonate.

* * * * *